United States Patent [19]
Tinner

[11] Patent Number: 4,817,915
[45] Date of Patent: Apr. 4, 1989

[54] SLIDE VALVE

[75] Inventor: Friedrich Tinner, Sax, Switzerland

[73] Assignee: Cetec AG, Sax, Switzerland

[21] Appl. No.: 133,784

[22] Filed: Dec. 16, 1987

[30] Foreign Application Priority Data

Dec. 18, 1986 [CH] Switzerland ............... 5100/86

[51] Int. Cl.⁴ ............................................. F16K 25/00
[52] U.S. Cl. ..................................... 251/199; 251/167
[58] Field of Search ....................... 251/167, 198, 199

[56] References Cited

U.S. PATENT DOCUMENTS

| | | | |
|---|---|---|---|
| 1,023,955 | 4/1912 | North | 251/167 |
| 3,027,135 | 3/1962 | Kellar | 251/199 |
| 3,586,034 | 6/1971 | Karzimucki | 251/199 X |
| 4,052,036 | 10/1977 | Schertler | 251/167 X |

Primary Examiner—A. Michael Chambers
Assistant Examiner—John C. Fox
Attorney, Agent, or Firm—Watson, Cole, Grindle & Watson

[57] ABSTRACT

A slide valve includes a valve housing and a valve closure control device which is laterally movable within the valve housing, the valve housing including two parallel flange members which have openings therein and seating surfaces on the facing sides thereof and the valve closure control device including a frame, two parallel shut-off plates mounted on the frame, the shut-off plates having triangularly-arranged cam projections on the facing sides thereof, and two shafts mounted on the frame between the shut-off plates, each shaft mounting three roll bodies for cooperation with two associated cam projections on one shut-off plate and a cam projection on the other shut off plate to move the plates apart and against the seating surfaces on the flange members when the valve closure control device is fully inserted within the valve housing and thus at its closure position therewithin.

5 Claims, 2 Drawing Sheets

SLIDE VALVE

BACKGROUND OF THE INVENTION

1. Field of the Invention

The present invention relates to a slide valve having a housing intended to be mounted into a flow channel and which includes guides for a lateral sliding-in of two shut-off plates that extend at a mutual distance parallel to each other and which in the open state of the valve are pulled towards each other, having further a closing mechanism located between the plates operative to urge each plate upon reaching its closed position against a front and rear valve seat in the casing, which mechanism includes a frame which is displaceable in the guides and is movable relative to the plates also in case the latter are in the closed position and is coupled for movement with the plates at the other operational positions via a drag mechanism, the frame being provided with at least two parallel shafts on which follower members, e.g., in form of roll bodies, are located at mutual distances, which run up on inclines at the reverse sides of the plates located oppositely of each other during the plates approaching their closed position and urge thereby the plates against the action of the pulling force apart from each other and onto the valve seats.

2. Description of the Prior Art

Such slide valves are commonly known and have application on a large variety of apparatuses and plants. In all known slide valves all roll bodies provided for urging the shut-off plates apart run up on the inclines at the reverse sides of the plates simultaneously so as to simultaneously wedge the plates apart and to urge them onto the seating surfaces. It, however, has been proven time and again that such a "rigid" mechanism does not provide any guarantee regarding a sufficient sealing of the valve.

SUMMARY OF THE INVENTION

It is, therefore, an object of the present invention to provide a valve of the type mentioned but wherein the sealing thereof is optimally secured at all operational conditions, specifically after the appearance of certain wear conditions.

A further object is to provide a slide valve in which only one incline on one respective reverse side of the plates is allocated to each follower member located on the shafts.

At a specifically preferred embodiment of the invention three roll bodies are arranged on each respective shaft at a lateral mutual distance from each other, whereby the two roll bodies of the one shaft which are located outside and the roll body of the other shaft which is located in the center cooperate by forming a three-point bearing with the inclines of the one plate and whereby the other roll bodies, also forming a three-point bearing cooperate with the inclines of the other plate.

The roll bodies arranged on the shafts are designed preferably as single or double wheels, e.g., in form of a respective race of a ball bearing.

The shafts which carry the roll bodies and extend between two longitudinal stringers of the frame can have a relatively small diameter and retain, therefore, a certain elasticity such that they may possibly deform easily upon getting urged against the plates (when the roll bodies run up the inclines). By a using of somewhat increased inclines it will be possible to urge the shut-off plates in any case sealingly against the valve seats without any jamming or causing any mechanical damage.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
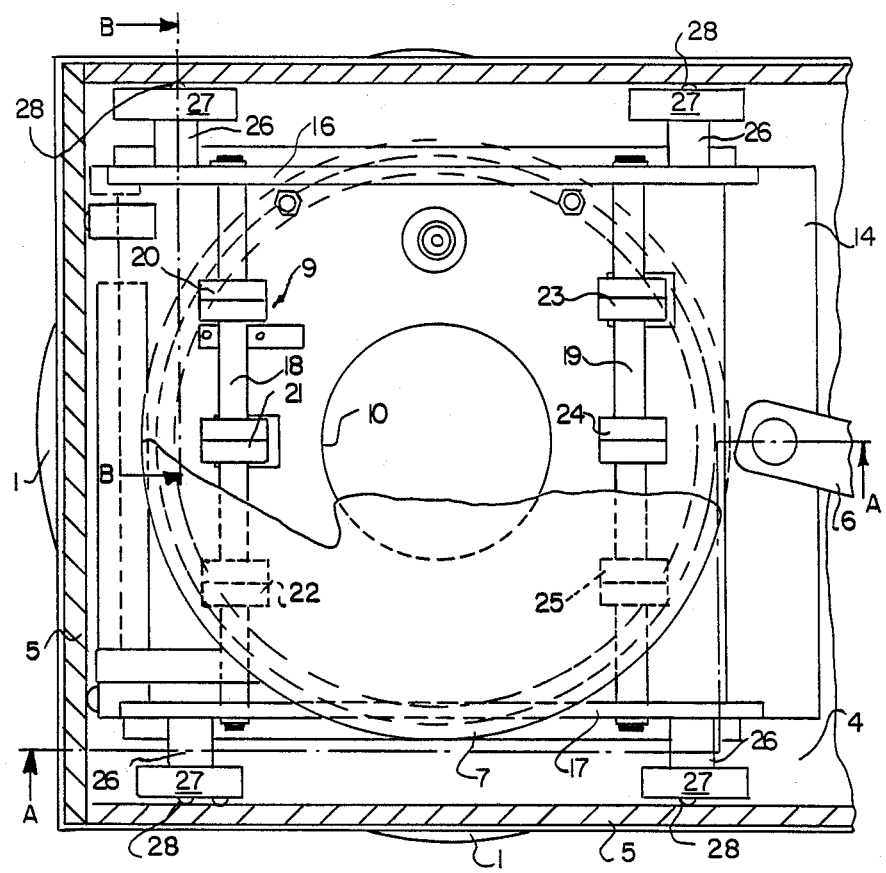
FIG. 1 a is partially broken away top view of a slide valve designed in accordance with the present invention.
Figure 2:
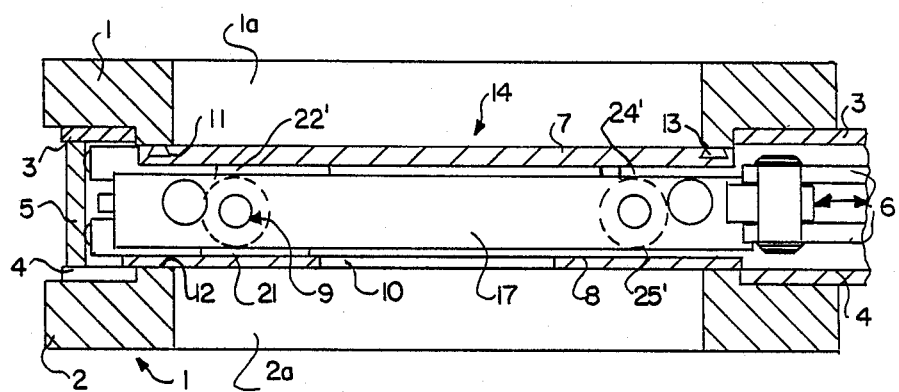
FIG. 2 is a sectional view of the slide valve as seen along line A—A in FIG. 1.

The inventive slide valve comprises a valve housing and a valve closure control device which is laterally movable within the valve housing into and out of a closure position therewithin.

The valve housing includes flange members 1 and 2 which respectively have openings 1a and 2a therein to form a fluid flow passage through the housing, and casing parts 3, 4 and 5 between the flange members to fixedly position the flange members in parallel with one another. The flange members form respective seating surfaces 11 and 12 around the openings 1a and 2a therein on the facing sides thereof.

The valve closure control device includes a frame 14 which, via a drag mechanism, mounts two parallel shut-off (closure) plates 7 and 8, the plate 7 (which actually functions as the valve closing element) having a greater thickness than plate 8 and also including a sealing ring 13 for cooperation with the sealing surface 11 on the flange member 1. The plate 8 includes a central opening 8 therein.

Normally, the plates 7, 8 are pulled against each other by means of tension springs 15 (FIG. 3) such that they are spaced from the seats 11, 12 during the inward and outward lateral movement of the frame 14 within the valve housing. As the frame 14 moves inwardly of the valve housing towards a closure position, the plates 7 and 8 become fixed in position in register with the openings 1a and 2a, and by continued movement of the frame (until its leading end abuts casing part 5) the plates 7 and 8 will be forced against the respective sealing surfaces 11 and 12 by a closing mechanism.

The closing mechanism proper comprises two shifts 18, 19 mounted on or possibly supported or journalled respectively in lateral stringers 16, 17 of the frame 14, on which shafts 18, 19 three respective roll bodies 20, 21, 22 and 23, 24, 25, respectively, are mounted, here in form of double ballbearing races. Each of these roll bodies 20-22 and 23-25 is cooperable with a cam projection on a facing side of one of the plates, the cam projections providing; respective inclines 20'-25', and the roll bodies 20-25 run up these inclines during a stationary condition of the plates 7, 8 yet continued movement of the frame such that the plates 7, 8 get urged away from each other and against the valve seats 11 and 12, respectively. The cam projections also provide flat planar sections at the ends of the inclines 20'-25' and on which the roll bodies rest during the closed state of the shut-off plates 7, 8. During the opening of the valve this procedure runs in the opposite way, whereby the plates 7, 8 are pulled along by the frame after the roll bodies 20-25 have moved downwards over the inclines 20'-25' and laterally out of the valve body.

In the illustrated embodiment the roll bodies 20, 22 and 24 form a three-point bearing and cooperate with the inclines 20', 22' and 24' at the reverse side of the plate 7, and the roll bodies 21, 23 and 25 form also a three-point bearing and cooperate with the inclines 21', 23' and 25' at the reverse side of plate 8.

According to this arrangement, the plates 7, 8 are urged in an optimal manner against the corresponding valve seats 11 and 12, respectively. The height of the inclines is chosen to be somewhat larger than the theoretical closing distance, such that a complete sealing is guaranteed also in case of slightly worn plates and valve seats. Because the shafts 18, 19 may be bent elastically, the respective roll bodies can deflect in accordance with the superelevation of the inclines.

Figure 3:
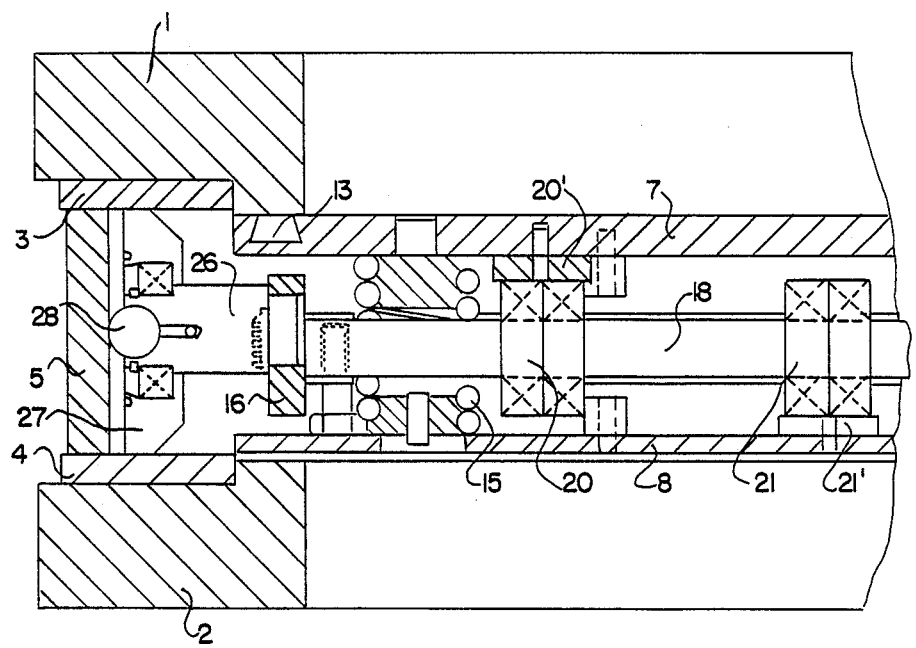
FIG. 3 is an enlarged sectional view of the slide valve as seen along line B—B in FIG. 1.

FIG. 3 of the drawing illustrates on an enlarged scale a part of the closing mechanism and depicts additionally how the displaceable frame 14 is guided and supported in the caseing. Four rollers 27 which are journalled on respective bolts 26, roll in the guide groove between the casing parts 3, 4, and each bolt also mounts a ball 28, which secures a lateral low frictional guide on the casing parts 5.

While there is shown and described a present preferred embodiment of the invention, it is to be distinctly understood that the invention is not limited thereto, but may be otherwise variously embodied and practiced within the scope of the following claims.

I claim:

1. A slide valve assembly which comprises
   a valve housing which includes a pair of flange members and a plurality of casing members positioned between said flange members so as to fixedly position said flange members in parallel with one another, each of said flange members having openings therein to form a fluid flow passage through the valve housing, and each of said flange members having a seating surface surrounding the opening therein on a side thereof which faces the other flange member, and
   a valve closure control device which is movable between said flange members of said valve housing into and out of a closure position within said valve housing at which said valve closure control device functions to block said fluid flow passage in said valve housing, said valve closure control device including
   a frame means,
   a first and second closure plates supported by said frame means so as to extend in parallel with said flange members, said first closure plate including three triangularly-arranged cam projections on a side thereof which faces said second closure plate and said second closure plate including three triangularly-arranged cam projections on a side thereof which faces said first closure plate, each of said cam projections including a first surface portion which is inclined relative to the associated closure plate,
   resilient means positioned between said first and second closure plates to urge them towards one another, and
   two spaced apart shafts mounted on said frame means and extending between said first and second closure plates, each said shaft including three roll bodies thereon, two of said three roll bodies on each said shaft being capable of contacting and rolling along the first surface portions of two cam projections on one of said closure plates and the third of said three roll bodies on each said shaft being capable of contacting and rolling along the first surface portion of a cam projection on the other of said closure plates,
   movement of said valve closure control device into said closure position causing said roll bodies on each of said shafts to contact said cam projections of each of said first and second closure plates to move said closure plates apart and into respective contact with said valve seating surfaces of said flange members.

2. A slide valve according to claim 1, wherein each of said roll bodies comprises double wheels.

3. A slide valve according to claim 1, wherein each of said cam projections includes a second surface portion which is parallel to the associated closure plate.

4. A slide valve according to claim 1, including drive means attached to said frame means of said valve closure control device to move said valve closure control device into and out of said closure position.

5. A slide valve according to claim 1, wherein said frame means of said valve closure control device includes two lateral stringers and a plurality of support rollers attached to each of said lateral stringers to enable said valve closure control device to roll within said valve housing and thus move between said flange members thereof.

* * * * *